United States Patent [19]
Sugiyama et al.

[11] Patent Number: 5,028,021
[45] Date of Patent: Jul. 2, 1991

[54] SMALL-DIAMETER PIPE CLAMPING STRUCTURE

[75] Inventors: Kenji Sugiyama; Masayoshi Usui, both of Numazu, Japan

[73] Assignee: Usui Kokusai Sangyo Kaisha Limited, Japan

[21] Appl. No.: 510,134

[22] Filed: Apr. 17, 1990

[30] Foreign Application Priority Data

Apr. 21, 1989 [JP] Japan ................. 1-47351[U]

[51] Int. Cl.⁵ .............................................. F16L 3/08
[52] U.S. Cl. ................................. 248/74.5; 24/20 R
[58] Field of Search ............... 248/55, 65, 74.1, 74.2, 248/74.3, 74.4, 74.5, 300; 24/20 R, 20 CW, 23 R

[56] References Cited

U.S. PATENT DOCUMENTS

| | | | |
|---|---|---|---|
| 1,676,485 | 7/1928 | Finucane | 248/74.5 |
| 1,769,573 | 7/1930 | Gwinn, Jr. | |
| 2,956,103 | 10/1960 | Steel et al. | 248/74.4 X |
| 3,169,004 | 2/1965 | Rapata | 248/745.5 X |
| 3,606,218 | 9/1971 | Enlund et al. | 248/74.2 |
| 3,906,592 | 9/1975 | Sakasegawa et al. | 248/74.3 X |
| 3,913,187 | 10/1975 | Okuda | 248/74.3 X |
| 4,442,994 | 4/1984 | Logsdon | 248/74.3 X |
| 4,455,715 | 6/1984 | Matsui | 248/74.3 X |
| 4,533,102 | 8/1985 | Ferrell | |
| 4,535,960 | 8/1985 | Downing et al. | 248/74.5 |
| 4,588,152 | 5/1986 | Ruehl et al. | |
| 4,790,502 | 12/1988 | Saegusa | |
| 4,801,115 | 1/1989 | Heard | |
| 4,826,114 | 5/1989 | Umehara | |
| 4,844,379 | 7/1989 | Umehara | 248/74.3 |
| 4,932,619 | 6/1990 | Usui | 248/74.1 |

*Primary Examiner*—Ramon O. Ramirez
*Attorney, Agent, or Firm*—Anthony J. Casella; Gerald E. Hespos

[57] ABSTRACT

The present invention provides a small-diameter pipe clamping structure comprising a bandlike clamp of specific form.

According to one embodiment of the invention, the clamp is provided on the upper surface thereof with a longitudinally extending raised wall (or walls) at the center and fitting holes at both ends thereof, respectively, such that when the clamp is fitted about the pipe in a looplike fashion and pressed from outside against the outer periphery of the pipe by using a press, the raised wall is brought into tight engagement with the outer periphery of the pipe to thereby secure the clamp to the pipe.

The invention is advantageous in that the clamp does not become displaced, separated from the pipe or missing and the pipe is prevented from being bruised even when it is subjected to vibrations during use.

11 Claims, 2 Drawing Sheets

PRIOR ART

SMALL-DIAMETER PIPE CLAMPING STRUCTURE

BACKGROUND OF THE INVENTION

1. Field of the Invention

The present invention relates to an improvement in a clamping structure for a metallic pipe or synthetic resin tube (hereinafter referred to as the "pipe") having a comparatively small diameter of less than about 30 m/m and frequently used as an oil or air supply path for automobiles or other various kinds of machines and equipment.

2. Description of the Prior Act

Conventionally, the above pipe clamping structure has comprised of a bandlike clamp 11 having at one end (FIG. 9) or both ends (FIG. 10) thereof a fitting hole 13 or holes 13 and 13' through which it is fixed to a basic body and a looplike clamp wall 12 at the other end (where only the fitting hole 13 is formed at the opposite end) and or at the intermediate portion thereof allowing both ends thereof to lie adjacent to each other (where the two holes 13 and 13' are fromed at the both ends) such that after the clamp wall 12 of the bandlike clamp has been fitted about a pipe P', the clamp is pressed from outside so that the inner peripheral surface of the clamp wall 12 is brought into tight contact with the outer peripheral surface of the pipe P'.

However, in the case of the above pipe clamping structure, the clamp fitted on the pipe P' has tended to become loosened due to the backlash taking place at the time of pressing the clamp from outside with respect to the pipe and the contact between the flat peripheral surfaces of the calmping wall of the clamp and the pipe so that when the pipe having such clamp fitted thereon is transferred, the clamp has become displaced axially or circumferentially, disconnected from the pipe or missing thereby hindering very much the mounting of the pipe in an automobile body and the like at a flow pattern assembling line. Further, due to the unstabilized fixing structure liable to become easily loosened, there has arisen a maintenance problem that the outer periphery of the pipe P' becomes bruised due to vibrations during the long time use of the pipe.

SUMMARY OF THE INVENTION

The present invention has been made in veiw of the abovementioned problem involved in the prior art pipe clamping structure and an object of the invention is to provide a pipe clamping structure comprising a clamp which can be securely fixed to a pipe with respect to the axial and circumferential directions of the latter, free of the fear of displacement falling or missing during transportation of the pipe and which can prevent the outer periphery of the pipe from being bruised even when it is subjected to vibrations in the state of its being fixed to pipe thereby eliminating the conventional maintenance problem with the additional advantage that in its preferred clamping structure, there is no fear of the clamp becoming loosened with respect to the pipe due to a backlash when the clamp is pressend aganist the pipe by a press.

In order to achieve the above object, the pipe clamping structure according to the present invention is characterized in that a bandlike clamp having on the upper surface thereof at least a raised wall extending in the longitudinal direction is fitted on a small-diameter pipe so as to clamp the outer periphery of the pipe with the raised wall or walls engaging the outer periphery of the pipe. In this case, the clamp may be further provided with engaging means comprising an engaging hole drilled at one end of the clamp and a projection engageable with the engaging hole when the pipe is clamped by the clamp and a plurality of raised walls like that which is described above arranged in substantially parallel relationships with one another or intermittently in a line.

With the above structure, it is possible with the present invention to secure a pipe to a wall or other structure with respect to the axial and circumferential directions of the pipe by fitting the bandlike clamp on the pipe so as to clamp the outer peripheral surface of the latter by the raised wall for walls of the clamp. Accordingly, even when the pipe having the clamp fitted thereon is transported or subjected to vibrations during long time use thereof, there is no fear of clamp becoming displaced, separated from the pipe or missing thereby preventing the outer periphery of the pipe from being brusied damaged.

DETAILED DESCRIPTION OF PREFERRED EMBODIMENTS

Figure 1:
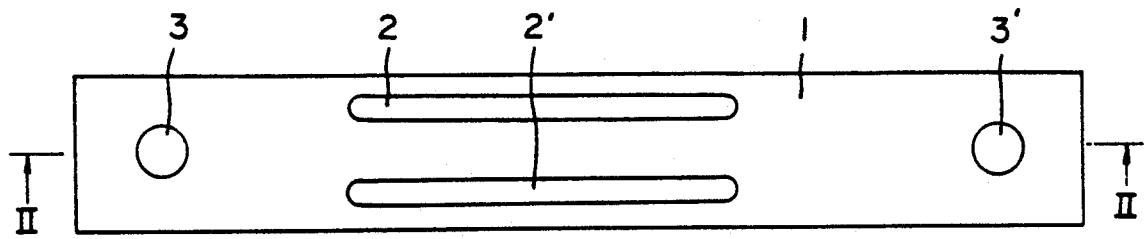
FIG. 1 is a developed plan view of a clamp for clamping clamping a small-diameter pipe, as one embodiment of the present invention.
Figure 2:
FIG. 2 is a sectional view taken along the II—II line of FIG. 1.
Figure 3:
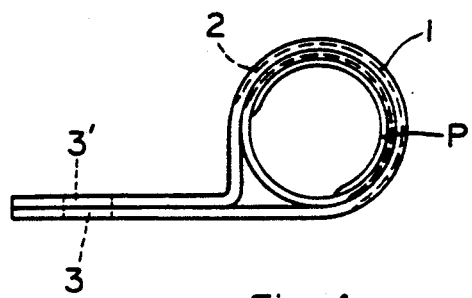
FIG. 3 is a side view of the clamp of FIG. 1.
Figure 4:
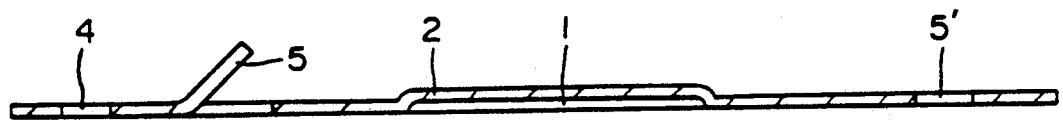
FIG. 4 is a sectional view of a clamp as another embodiment of the present invention, which view corresponds to FIG. 2.
Figure 5:
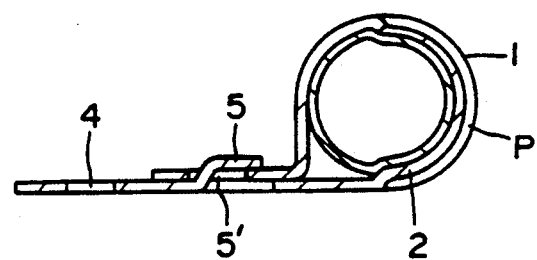
FIG. 5 is a cross sectional view of the clamp of FIG. 4 especially when the clamp is fixed to a pipe.

In FIGS. 1 through 8, reference nemeral 1 designates a bandlike clamp formed by pressing a metallic material. This clamp is provided with a plurality of raised walls 2, 2' extending parallel to one another on the upper surface thereof and fitting holes 3, 3' at both ends thereof through which the clamp is bolted to a basic structure. FIGS. 4 and 5 show another embodiment of the invention wherein the clamp has only a single fitting hole 4 at one end thereof. Further, it is provided on the upper surface thereof with a single raised wall 2 extending in the longitudinal direction at substantially the center of its width, an engaging hole 5' at the other end thereof and a projection 5 extending upward at a position near the fitting hole 4 and engageable with the engaging hole 5'. Where the clamp 1 is fitted on the pipe P, the clamp 1 is passed around the straight portion of the pipe with the upper surface of the clamp having the raised wall facing the outer periphery of the pipe thereby clamping the pipe and the raised wall of the clamp is brought into tight contact with the outer periphery of the pipe by a press so that the clamp is secured to the pipe both in the axial and circumferential directions of the pipe.

Figure 6:
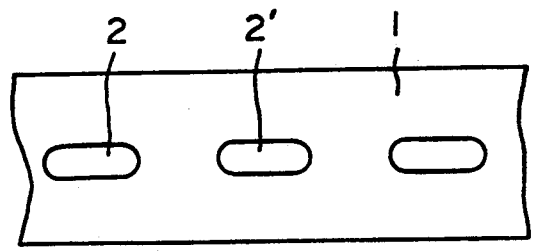
FIG. 6 is a partial plan view of another embodiment of a clamp in its developed state.
Figure 7:
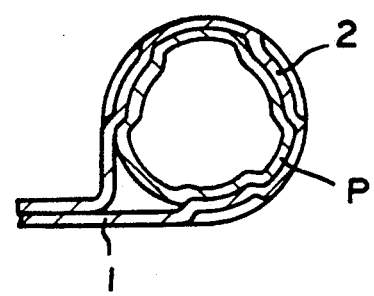
FIG. 7 is a partial enlarged cross-sectional view showing a fixing state of the clamp of FIG. 6 to a pipe.

Further, as shown in FIG. 6, the raised walls 2, 2' of the clamp may be formed in a line in an intermitted state so that when the clamp is fitted on the pipe, the raised walls 2, 2' of the clamp tightly engage the outer periphery of the pipe.

Figure 8:
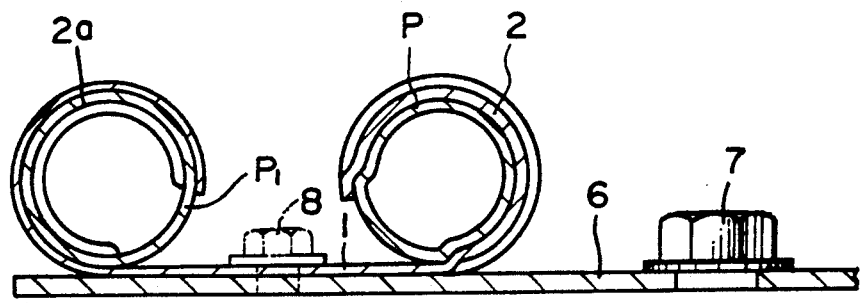
FIG. 8 is a cross-sectional view showing a fixing state of a clamp as still another embodiment of the invention.
Figure 9:
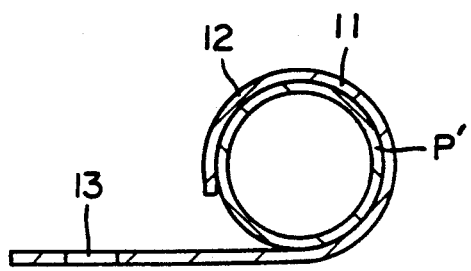
FIGS. 9 and 10 are cross-sectional views respectively showing fixing states of conventional clamps to pipes.
Figure 10:
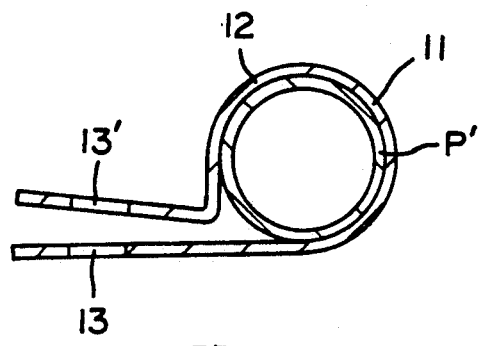

In addition, referring to FIG. 8, the clamp 1 may be provided with raised walls 2, 2' and 2a, 2a' at both end portions thereof, respectively, so that two pipes P, P' are respectively clamped by both ends of the clamp 1 and then the clamp is fixed to the pipes by pressing the raised walls 2, 2' and 2a, 2a' against the outer peripheries of the pipes. In this case, the clamp 1 may be welded to another bandlike member 6 which may, in turn, be fixed to a basic body or structure, or alternatively, the clamp 1 may be provided with a central fittng hole through which it may be directly attached to the basic body by means of a bolt 8.

As described above, the small-diameter pipe clamping structure of the present invention has such verious advantages that due to the provision of the raised walls 2, 2' on the upper surface of the clamp 1, the clamp is securely fixed to the pipe P with respect to both the axial and circumferential directions of the pipe with the raised walls of the clamp held in tight engagement with the outer periphery of the pipe so that even when the pipe having such clamp fitted thereon is transported or subjected to vibrations during the long time use thereof, the clamp does not become displaced, separated or missing and so the installation of the pipe at a flow pattern type vehicle body assembling line can be smoothly performed and further that the clamping structure is very useful in view of maintenance because the outer periphery of the pipe is prevented from being bruised and especially in the case of the embodiment of FIGS. 4 and 5, the loosening of the clamp with respect to the pipe due to a backlash at the time of pressing can be prevented.

What is claimed is:

1. A small-diameter pipe clamping structure for attachment of a pipe to a basic body, said structure comprising a bandlike clamp having at least a first longitudinally extending section with means for attachment of the pipe to the basic body, and at least a second longitudinally extending section curved in the longitudinal direction to define an inner circumferential surface for engaging the pipe, the inner circumferential surface comprising at least one inwardly projecting raised wall extending in the longitudinal direction so that when the clamp is fitted about a pipe, the raised wall of the clamp and portions of the inner circumferential surface adjacent the raised wall are brought into tight engagement with the outer peripheral surface of the pipe thereby fixing the clamp to the pipe.

2. A structure according to claim 1, wherein said clamp is provided with an engaging hole at one end and a projection at the other end thereof, said engaging hole and said projection forming an engaging means by which said clamp is fitted about said pipe.

3. A structure according to claim 1, wherein said clamp is provided on the inner circumferential surface thereof with a plurality of raised walls parallelly extending in the longitudinal direction thereof.

4. A structure according to claim 1, wherein said clamp is provided on the upper surface thereof with a plurality of raised walls which are formed intermittently in a line.

5. A structure according to claim 1, wherein said clamp is provided with a fitting hole in the first longitudinally extending section for defining the means for attachment of said clamp to the basic body.

6. A structure according to claim 5, wherein said fitting hole is dirilled at least one end portion of said clamp.

7. A structure according to claim 1, wherein said engagement between the raised wall of said clamp and the outer periphery of said pipe is effected by using a press.

8. A small-diameter pipe and clamping structure for attachment of the pipe to a basic body comprising:
a bandlike clamp having at least a first longitudinally extending section with means for attachment of the pipe to the basic body, and at least a second longitudinally extending section curved in the longitudinal direction to define an inner circumferential surface, the inner circumferential surface comprising at least one inwardly projecting raised wall extending in the longitudinal direction of the bandlike clamp; and
at least one pipe having an outer circumferential surface tightly engaged by the inner circumferential surface of the clamp, the outer circumferential surface of the pipe being characterized by at least one inwardly formed circumferentially extending groove tightly engaged by the inwardly projecting raised wall of the clamp, whereby the tight engagement of the inner circumferential surface and the raised wall of the clamp with the other circumferential surface and the groove of the pipe securely fixes the pipe in axial and circumferential directions relative to the clamp.

9. A small-diameter pipe and clamping structure as in claim 8 wherein the clamp comprises a plurality of raised walls and wherein the pipe comprises a corresponding plurality of inwardly formed grooves, the raised walls of the clamp being tightly engaged with the corresponding grooves in the pipe.

10. A small-diameter pipe and clamping structure as in claim 9 wherein the raised walls of the clamp are generally parallel to one another, and wherein the corresponding grooves of the pipe are parallel to one another.

11. A small-diameter pipe and clamping structure as in claim 9 wherein the raised walls of the clamp are disposed intermittently in a line, and wherein the grooves of the pipe are disposed intermittently in a circumferentially extending line around the pipe.

* * * * *